(12) United States Patent
Faust et al.

(10) Patent No.: US 6,432,528 B1
(45) Date of Patent: Aug. 13, 2002

(54) VARIABLY PRINTED TAPE AND SYSTEM FOR PRINTING AND APPLYING TAPE ONTO SURFACES

(75) Inventors: Michael C. Faust, White Bear Lake, MN (US); Keith M. Martin, Penrith (AU); Lloyd S. Vasilakes, Stillwater; Thomas L. Wood, Maplewood, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/207,801

(22) Filed: Dec. 9, 1998

(51) Int. Cl.$^7$ ............................. C09J 7/02; B32B 7/12
(52) U.S. Cl. ..................... 428/354; 428/343; 428/353; 428/354
(58) Field of Search ................. 428/354, 353, 428/352, 343, 40.1, 913

(56) References Cited

U.S. PATENT DOCUMENTS

| | | | |
|---|---|---|---|
| 2,532,011 A | | 11/1950 | Dahlquist et al. |
| 2,607,711 A | | 8/1952 | Hendricks |
| 3,318,852 A | | 5/1967 | Dixon |
| 3,502,497 A | | 3/1970 | Crocker |
| 4,241,198 A | | 12/1980 | Kobayashi |
| 4,421,817 A | | 12/1983 | Pina et al. |
| 4,707,211 A | | 11/1987 | Shibata |
| 4,717,621 A | | 1/1988 | So et al. |
| 4,728,571 A | | 3/1988 | Clemens et al. |
| 4,807,177 A | | 2/1989 | Ward |
| 4,851,383 A | * | 7/1989 | Fickenscher et al. ........ 503/200 |

(List continued on next page.)

FOREIGN PATENT DOCUMENTS

| | | |
|---|---|---|
| DE | 3 727 667 | 3/1989 |
| DE | 1 960 9431 | 9/1997 |
| EP | 0 096 841 | 12/1983 |
| EP | 0 170172 | 2/1986 |

(List continued on next page.)

OTHER PUBLICATIONS

John Wiley & Sons *Encyclopedia of Polymer Science and Engineering*, vol. 13 (1998).
*Encyclopedia of Polymer Science and Technology*, vol. 1 (1964).

(List continued on next page.)

*Primary Examiner*—Daniel Zirker
(74) *Attorney, Agent, or Firm*—Melissa E. Buss (57) ABSTRACT

An apparatus for printing variable information on a tape to form a tape segment, cutting the tape segment to form a tag, and applying the tag onto an object includes a printer for printing information onto the tape segment. A controller controls the printer in response to input to vary the information printed onto the tape. The printed tape segment is transported to a location for application onto the object and is cut.

An adhesive tape can have variable information printed on it and can be applied onto an object. The tape includes a backing layer and an adhesive layer on the first side of the backing layer. At least one of the backing layer and the adhesive layer are colored to yield a tape opacity of greater than 60. The tape can have a scan rating of at least C when applied on a black background and an opacity of at least 65. The tape can achieve specific scan ratings when adhered to surfaces that have color coordinates including combinations of $a^*$, $b^*$, and $L^*$ that are selected in combination with each other.

9 Claims, 3 Drawing Sheets

U.S. PATENT DOCUMENTS

| | | |
|---|---|---|
| 4,857,134 A | 8/1989 | Lin |
| 4,942,212 A | 7/1990 | Hanada et al. |
| 5,032,460 A | 7/1991 | Kantner et al. |
| 5,037,219 A | 8/1991 | Duport |
| 5,053,436 A | 10/1991 | Delgado |
| 5,202,190 A | 4/1993 | Kantner et al. |
| 5,214,119 A | 5/1993 | Leir et al. |
| 5,242,888 A | 9/1993 | Atherton et al. |
| 5,286,682 A | 2/1994 | Jacobs et al. |
| 5,290,615 A | 3/1994 | Tushaus et al. |
| 5,292,713 A | 3/1994 | Stenzel et al. |
| 5,328,754 A | 7/1994 | Yuyama et al. |
| 5,354,588 A | 10/1994 | Mitchell et al. |
| 5,356,706 A | 10/1994 | Shores |
| 5,376,418 A | 12/1994 | Rogers et al. |
| 5,461,133 A | 10/1995 | Hammar et al. |
| 5,478,880 A | 12/1995 | Shipston et al. |
| 5,487,337 A | 1/1996 | Uland |
| 5,497,701 A | 3/1996 | Uland |
| 5,524,996 A | 6/1996 | Carpenter et al. |
| 5,540,369 A | 7/1996 | Boreali et al. |
| 5,543,192 A | 8/1996 | Shipston et al. |
| 5,560,293 A | 10/1996 | Boreali et al. |
| 5,569,515 A | 10/1996 | Rice, II et al. |
| 5,571,617 A | 11/1996 | Cooprider et al. |
| 5,621,020 A | 4/1997 | Khatib et al. |
| 5,621,030 A | 4/1997 | Shipston et al. |
| 5,661,099 A | 8/1997 | Mitchell, Jr. |
| 5,674,626 A | 10/1997 | Khatib et al. |
| 5,692,896 A | 12/1997 | Pospisil et al. |
| 5,750,630 A | 5/1998 | Sengupta |
| 5,782,496 A | 7/1998 | Casper et al. |
| 5,832,827 A | 11/1998 | Pistro et al. |
| 5,857,789 A | 1/1999 | Day et al. |
| 5,874,499 A | 2/1999 | Shipston et al. |
| 6,049,347 A | 4/2000 | Ewert et al. |
| 6,067,103 A | 5/2000 | Ewert et al. |

FOREIGN PATENT DOCUMENTS

| | | |
|---|---|---|
| EP | 0 579 423 | 1/1994 |
| EP | 0 579430 | 1/1994 |
| EP | 0 613 787 | 9/1994 |
| EP | 0 673 839 | 9/1995 |
| EP | 0 688 008 | 12/1995 |
| EP | 0 397 379 B1 | 9/1996 |
| EP | 0 763 471 | 3/1997 |
| EP | 0 854 051 A1 | 7/1998 |
| EP | 00 905 210 | 3/1999 |
| WO | WO 92/07347 | 4/1992 |
| WO | WO 93/09195 | 5/1993 |
| WO | WO 95/21224 | 8/1995 |
| WO | WO 95/31800 | 11/1995 |
| WO | WO 96/21557 | 7/1996 |
| WO | WO 96/40508 | 12/1996 |
| WO | WO 97/43744 | 11/1997 |
| WO | WO 97/46389 | 12/1997 |
| WO | WO 99/13015 | 3/1999 |
| WO | WO 99/20468 | 4/1999 |

OTHER PUBLICATIONS

N. Draper & H. Smith, *Applied Regression Analysis*, 2$^{nd}$ Ed., Chapters 2 and 6 (1966).

Bill Meyer & Saltzman, *Principles of Color Technology*, 2$^{nd}$ Ed., pp. 62–65 (1981).

Irving Skeist, *Handbook of Adhesives*, 2$^{nd}$ Ed., p. 102 (1977).

*Research Disclosure*, Nov. 1994, No. 367.

* cited by examiner

VARIABLY PRINTED TAPE AND SYSTEM FOR PRINTING AND APPLYING TAPE ONTO SURFACES

TECHNICAL FIELD

The present invention relates to tape. More particularly, the present invention relates to printing on tape and applying the tape onto surfaces.

BACKGROUND OF THE INVENTION

Containers, packages, cartons, and cases, (referred to as "boxes") for storing and shipping products typically use box sealing tape, an adhesive tape, to secure the flaps or covers so that the box will not accidentally open during normal shipment, handling, and storage. Box sealing tape maintains the integrity of a box throughout its entire distribution cycle. Box sealing tape can be used on other parts of boxes and on other substrates and can be used to function similarly to labels. These tapes can be made in roll or pad form. They can be transparent, translucent, or opaque, and can have information printed or otherwise applied to the tape.

These boxes generally contain information about the contents. This information, most commonly located on the box, might include lot numbers, date codes, product identification information, and bar codes. The information can be placed onto the box using a number of methods. These might include preprinting the box when it is manufactured, printing this information onto the box at the point of use with an inkjet coder that sprays a pattern of ink dots to form the image, or by using a flexographic ink rolling coder system. Other approaches include the use of labels, typically white paper with preprinted information either applied manually, or with an online automatic label applicator.

A recent trend in conveying information related to the product is the requirement to have the information specific for each box. For example, each box could carry specific information about its contents and the final destination of the product, including lot numbers, serial numbers, and customer order numbers. The information is typically provided on labels which are customized and printed on demand at the point of application onto the box. This is typically known as the ability to print "variable" information onto a label before it is applied onto the box. Two patents that disclose printed labels are U.S. Pat. Nos. 5,292,713 and 5,661,099.

One system for printing variable information involves thermal transfer ink printing onto labels using an ink ribbon and a special heat transfer printing head. A computer controls the printing head by providing input to the head which heats discrete locations on the ink ribbon. The ink ribbon directly contacts the label so that when a discrete area is heated the ink melts and is transferred to the label. Another approach using this system is to use labels that change color when heat is applied (thermal labels). In another system, variable information is directly printed onto a box by an inkjet coder. The ink pattern sprayed onto the box or onto a label can be controlled by a computer.

Both thermal transfer and inkjet systems produce sharp images. Inkjet systems include piezo, thermal, continuous, and drop-on-demand. With both inkjet and thermal transfer systems, the print quality depends on the surface on which the ink is sprayed. It appears that the best system for printing variable information is one in which the ink and the print substrate can be properly matched to produce a repeatable quality image, especially bar codes, that must be read by an electronic scanner with a high degree of reliability.

A variety of applying systems are available that incorporate a printing system, computer-controlled heated printing head, and guiding systems for the thermal transfer ink ribbon label and the liner. The PA/4020 Dual Panel Printer/Applicator made by Diagraph Corp. (Earth City Mo.), the 2138 Printer/applicator made by Label-Aire Inc. (Fullerton, Calif.), and the 2800 Print/apply corner applicator made by Labeling Systems, Inc. (Oakland, N.J.) are some examples. These systems print on linered labels. The liner is the carrier for the label material. These systems print discrete messages onto the label, strip the label from its liner, and transfer the printed label onto a box. Although there are other materials available, such as polyesters, from which labels can be made, paper labelstock is the most popular because of its ready acceptance of thermal transfer ink and its low cost.

"Labelstock" is a multiple layer product having a facestock material that is typically paper in the range of 45–50 pound paper stock. One surface contains pressure sensitive adhesive. The non-adhesive surface of the label is free of any release treatments to allow for durable anchoring of the ink image. Because there is no release treatment, the adhesive side of the labelstdck cannot contact the other side. To allow the material to be provided in a roll format requires a liner material, typically paper treated with a release layer. This lamination of facestock and release liner forms the labelstock.

To provide discrete labels from this continuous roll, the labelstock must first be converted on a machine that cuts the facestock (but not the release liner) to a specific length and width separating it from the continuous web. The width of the label must be narrower than the width of the input labelstock. To allow for dispensing in an applicator there must be a continuous length of uncut facestock, or at least a length of liner, along each edge of the labelstock. The length of the label depends on the application requirements but adjacent labels must be the same length. If different label sizes are required for labeling applications, different supply rolls containing the die cut size label must be used.

When a label is applied to the box and is exposed to the typical shipping environment (scuffing against boxes or other fixed objects such as conveyor belts, pallets, and shipping trucks) damage can occur. The label can be damaged such that the printed message cannot be read and any bar code images are not reliably scannable. Also, labeled boxes may not be recyclable and are not easily separated from corrugated boxes during the recycling process. Typically these labels use an acrylic adhesive. During recycling, the backing and the adhesive cannot always be removed from the corrugated box base material being recycled. This produces a pulp product with contaminants that do not allow for reuse in producing a new, high quality box.

Minnesota Mining and Manufacturing Company of St. Paul Minn. (3M) has sold an automatic system for applying pre-printed tape (with non-variable information) with bar codes since 1994 (Model Nos. TA 1340, TA1341, and TA1342). This system can apply a corner label onto a box while the box is conveyed through a case sealer, or it can apply pre-printed tape onto a flattened box before the box is opened. This system offers an inexpensive, simple alternative to linered labels.

Printable tapes for applying on boxes, such as those disclosed in U.S. Pat. Nos. 4,421,817, 5,242,888, 5,354,588, 5,478,880, and 5,560,293, are known. However, these tapes are not capable of sealing boxes and receiving printed information of very high quality. There is a need for a system that can print variable information onto tape and apply the tape onto boxes.

SUMMARY OF THE INVENTION

The invention is an apparatus for printing variable information on a tape to form a tape segment, cutting the tape segment to form a tag, and applying the tag onto an object. The apparatus includes a printer for printing information onto the tape and a controller for controlling the printer in response to input to vary the information printed onto the tape. The tape segment is transported to a location for application onto the object and the tape segment is cut. Finally, the printed tag is applied onto the object.

The apparatus can transport the tape segment to be applied to perform next tag out application. The apparatus can be part of a case sealing apparatus for sealing boxes using tape.

The object onto which the tag is to be applied can be a box having sides, corners, and seams along which the box is sealed. The tag can be applied onto at least one of the sides, the corners, and the seams of the box. Also, the tag can be applied along at least one of the seams of the box to seal the box with a tag that is printed with information that was variably printed. This tag can maintain the box closed during shipping and handling.

The printer can use thermal transfer printing, inkjet printing, or laser printing.

The invention is also an adhesive tape capable of having variable information printed on a segment of the tape and capable of being applied as a tag onto an object. The tape includes a non-paper backing layer having a first side and a second side. An adhesive layer is located on the first side of the backing layer. At least one of the backing layer and the adhesive layer are colored to yield a tape opacity of greater than 60.

Ink can be printed on the side of the tape opposite the adhesive layer. Also, the ink can be flood coated between the backing layer and the adhesive layer or on top of the backing layer. The color of at least one of the backing layer and the adhesive layer can be white.

The tag can have a scan rating of at least C when applied on a black background and an opacity of at least 65. The tag can have a scan rating of A when applied on a black background and an opacity of at least 80. Also, the tag can have a rub resistance of at least Good.

The tag can serve as a box sealing tape. The backing layer can be treated by at least one of a primer, flame, and corona. The tape can include a low adhesion backsize layer located on the second side of the backing layer. The low adhesion backsize layer can include a silicone, an alkyl, fluorochemical constituents, and combinations of these.

The tag can achieve specific scan ratings when adhered to surfaces that have color coordinates including combinations of $a^*$, $b^*$, and $L^*$ that are selected in combination with each other.

DETAILED DESCRIPTION

The invention includes a system for providing information on a surface or an object. The object can be a box, such as a box or case. The invention also Iincludes a self-wound roll of tape from which tags are made, and a print and applying system for applying the tags onto boxes. This differs from known systems which use pre-measured, precut labels of a fixed size or which can not variably print on tape.

Throughout this description, the term "tape," as used here, is limited to a substrate that is linerless; that can be supplied in a roll form (in which it is self-wound) or other form; and that is not precut. The term "tag" will be used to mean something that can convey information (such as by printing), that can be affixed to a surface, and that is severed from the rest of the tape. Before the tag is severed from the remainder of the strand or roll of tape, the portion of the tape that will become the tag (whether printed or not) will be referred to as a tape segment. Tags, therefore, are a subset of tape segments, which, in turn, are a subset of tapes.

Tags distinguish this invention from existing products and systems that use precut labels. (The tags provide the same information conveying function as known labels.) There is no known system which uses tape as a component of a variable print and apply system. Throughout this description, the term "variable" printing means printing customized information on demand to form a tape segment (such as at the point of application of the tag). Information is any information, including words, symbols, graphics, symbols, and bar codes. The term "ink" includes dyes and pigments added to a medium, and any printing media that can include solvents, non-solvents, and toners. Ink can be provided to the tape by any known method including using a ribbon as a carrier.

The invention facilitates labeling surfaces using tags. The system prints information onto a tape to form a tape segment, and can vary the information placed on each tape segment to allow for an infinite variation of tag content and lengths to be produced from one supply roll of tape. The system can apply the printed tag onto the box either while the box is stationary or while the box is moving (such as while the box is being closed and sealed). The system applies the tag either on the side of the box to serve as only a conveyor of information; applies the tag as an L-clip onto the corner of the box to convey information, to serve as a box closure device (without print), or a combination conveyor of information and box closure device; or applies the tag along a seam of the box to serve as either a box closure device (without print) or a combination conveyor of information and box closure device.

The invention improves recyclability of used boxes, reduces the amount of material required to provide a tag carrying variable information, can combine sealing the box and providing information, and is more durable at lower cost than current labeling systems. The system can automatically apply the tag onto boxes, as discussed above or the printed tag can be dispensed for manual application.

Tests of known tape constructions have found that existing off-the-shelf tapes have inconsistent quality print on the finished product. Scannability is one governing criterion for acceptability because it is a higher standard than mere readability by the unaided eye and it is an objectively measurable quantity. Of course, bar codes are not the only form of information to be printed. Any other information can be printed onto tapes.

Tape opacity is a property that affects the scan ratings of printed information. Typically, the greater the opacity, the better the tape performs. Opacities greater than 60–65 have been found to be satisfactory. However, through testing, it was discovered that to achieve A scan ratings, the tape should have an opacity of greater than 80, preferably at least 83, and more preferably at least 85. Known tapes had scan ratings of from A to F, with the ratings decreasing in quality from A to B to C to D to F. A result worse than F, achieved by some known tapes, is "no decode," which means that the bar code cannot be read. Although A ratings are preferred, even D ratings, and sometimes F ratings, are acceptable in some situations.

Many conventional box sealing tapes will work on white boxes and in environments where there is little wear on the tape (such as scuffing). However, these tapes, even when made with white film and white adhesive and in thicknesses of 0.004 cm (0.0016 in) do not achieve A scan ratings on black backgrounds and are subject to significantly decreased scan ratings when subjected to real world conditions such as rubbing and scuffing. Testing against black backgrounds is important because tags are used on boxes that are preprinted with black ink and the tags must be read after application over the black portions. The scan rating and resolution characteristics are measured against a black background, a more stringent test than measuring against a white background.

Current box sealing tapes are not printed with precise logistics information such as barcodes; thus, their opacity is not a concern. The inventors recognized that to print barcodes on tape, the resolution of the printing and high contrast are important. In response, the inventors have developed new tapes that have sufficient opacity and contrast (including brightness and reflectiveness) and are capable of A scan ratings when printed with bar codes. These tapes are superior to known box sealing tapes and linerless labels.

The inventors have created a tape construction that overcomes the disadvantages of the known tapes. The tape 14 can be a single-coated pressure sensitive adhesive tape made of a multiple layer construction. The backing layer can be, for example, a single or multiple layer plastic film backing. Suitable plastic film backings include polypropylene, polyethylene, copolymers of polypropylene and polyethylene, polyvinyl chloride (PVC), polyesters, and vinyl acetates. The polypropylene can include monoaxially oriented polypropylene (MOPP), biaxially oriented polypropylene (BOPP), or sequentially or simultaneously biaxially oriented polypropylene (SBOPP). The backing material can be compostible, degradable, colored, printed, and can be of different surface textures or embossed. Pressure sensitive adhesive is coated onto one side of the backing and a release coating (a low adhesion backsize (LAB) coating) is optionally coated on the opposite side to allow the tape to unwind from itself when wound in a roll.

Because certain release coatings on pressure sensitive adhesive tapes are not intended to be printed, the ink may not securely anchor because it is poorly bonded to the surface of the release coating. The ink may be easily scuffed, marred, or distorted under normal use conditions. The release coating on the tape of the invention can accept ink, such as from a flexographic process or from a thermal transfer method. The release coating can prevent dirt from adhering in the pores of the film layer and affecting the scannability of the tape. Testing has shown that thermal transfer printing using a compatible ink transfer ribbon onto the release coating can provide sufficiently high anchorage levels that the ink can not be scuffed off. The rub resistance test described in the examples is one indicator of scuff resistance. And this tape is less expensive than known labels. The release coating composition should be compatible with the adhesive composition and does not degrade the adhesive properties of the tape such as by being transferred to the adhesive composition.

Release coating compositions for the LAB layer of tapes in roll form may include silicone, alkyl, or fluorochemical constituents, or combinations as the release imparting component. Useful release coating compositions for the invention include silicone containing polymers, such as silicone polyurethanes, silicone polyureas and silicone polyurethane/ ureas, such as those described in U.S. Pat. Nos. 5,214,119, 5,290,615, 5,750,630, and 5,356,706, and silicone acrylate grafted copolymers described in U.S. Pat. Nos. 5,032,460, 5,202,190, and 4,728,571. Other useful release coating compositions include fluorochemical containing polymers such as those described in U.S. Pat. No. 3,318,852, and polymers containing long alkyl side chains such as polyvinyl N-alkyl carbamates (e.g., polyvinyl N-octadecyl carbamates) as described in U.S. Pat. No. 2,532,011, and copolymers containing higher alkyl acrylates (e.g., octadecyl acrylate or behenyl acrylate), such as those described in U.S. Pat. No. 2,607,711, or alkyl methacrylates (e.g., stearyl methacrylate) such as those described in U.S. Pat. Nos. 3,502,497 and 4,241,198, where the alkyl side chain includes from about 16 to 22 carbon atoms.

These release polymers can be blended with each other and with thermosetting resins or thermoplastic film forming polymers to form the release coating composition. In addition, other additives may be used in the release coating compositions such as fillers, pigments, wetting agents, viscosity modifiers, stabilizers, anti-oxidants, and cross-linking agents.

Numerous other layers can be added to the tape, such as primers to increase adhesive layer adhesion to the backing layer. Also, printed material can be located on the first side of the backing layer under or over the adhesive, or on the second side of the backing layer under or over any LAB layer. This printed material can be any information like advertising or instructions. Also, an additional flood layer of ink or similar coating can be used to alter the opacity of the tape. The tape could contain deodorants, perfumes, antistatic materials, and encapsulated cleaning chemicals. Also, the release properties of the backing can be modified such that the backing and the adhesive cooperate to achieve desired unwind characteristics. The release properties of the backing can be modified by applying a low surface energy composition, priming, corona discharge, flame treatment, roughening, etching, and combinations.

Many types of adhesives can be used. The adhesive can include hotmelt-coated formulations, transfer-coated formulations, solvent-coated formulations, water-based, and latex formulations. Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

Useful adhesives according to the present invention can be pressure sensitive adhesives. Pressure sensitive adhesives are normally tacky at room temperature and can be adhered to a surface by application of, at most, light finger pressure. A general description of useful pressure sensitive adhesives may be found in *Encyclopedia of Polymer Science and*

*Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

In addition to having an opacity of at least 85 and A scan ratings, the tapes of the invention should also have other desirable characteristics. They should have a "good" dry and wet rub resistance, as measured by the Sutherland Rub Test. This means that at 25 strokes with a 1.8 kg (4 $lb_m$) test block using kraft paper there is no sign of ink transfer or abrasion. They have a wet smear resistance, as measured by a smear test. This means that at 25 strokes with a 0.9 kg (2 $lb_m$) test block using a wet muslin cloth, there is no sign of ink transfer or smearing. They also have a dirt resistance, as shown by applying toner powder from a laser printer or copy machine to a dry muslin cloth and smearing the toner powder onto the tape. The result is visually observed and rated as "Good" if no toner powder was transferred to the tape, "Average" if some tone powder was transferred to the tape, and "Poor" if a lot of toner powder was transferred to the tape.

The tapes of the invention should also exhibit an overall good resolution or image quality (as described in the examples). This means a clear sharp image with no voids or frayed edges visible. This also means that two-dimensional bar codes can be printed with the desired precision. (Two-dimensional bar codes use both horizontal and vertical encoding to achieve character densities of up to 310 characters/$cm^2$ (2000 characters/$in^2$).

Good resolution is attained, as described, by at least one of the backing layer, the adhesive layer, and the low adhesion backsize layer being colored. This could also be attained by other methods including increasing the reflectance through the tape by using a retroreflective layer between the backing and the LAB or using a diamond grade layer between the backing and the LAB; decreasing the transmittance through the tape or controlling the reflectance of the tape by making the tape more opaque, such as by adding pigment, making the tape thicker (whether with a single or any number of multiple layers), or using a metallized layer between the adhesive and the backing; decreasing the light absorption of the tape by increasing the opacity; controlling the reflectance of the tape by using a matting agent in the LAB or embossing the backing; or increasing the tape's receptiveness to ink by using an adhesion promoter or top coat on the LAB.

Another way to define the invention is to quantify the backgrounds on which the tag will operate satisfactorily. Satisfactory operation can be defined one way as one where, if the tag has a bar code, the bar code has any readable scan rating (of at least F). The environments in which this can occur can be defined by the color attributes of the surface on which the tag is adhered. (See the Examples.) The color space (a three-dimensional color coordinate system that defines all colors) that was used to define the color attributes includes the opponent-colors system which measures colors using the qualities of black-to-gray-to-white (or lightness) (L*), red-to-green (a*), and blue-to-yellow (b*). (These coordinates are sometimes referred to as L, a, and b, and have ranges of from 0 to 100, −120 to +120, and −120 to +120, respectively.

The tape 14 can be self-wound after printing variable information to form a tape segment and upon unwind, there is almost no picking when evaluated using the percent picking test described in the Examples. That is, none of the ink transfers to the adhesive. Also, the tape can be preprinted in color along part of its width and can be selectively variably printed along the remaining width.

One printing method used was the thermal transfer method that uses an ink-carrying ribbon. Printing directly onto tape having an LAB release coating and obtaining a scuff resistant bond onto this release coating with an A scan rating is new. The inventors tested many ribbons for use with a thermal transfer printing system. (It is known that it is necessary to choose compatible materials in the donor (ribbon) and receptor (tape) components to meet solubility parameters.) Most would not achieve the desired level of scannability. Several commercially available ribbons were found to result in printed tape with an A scan rating as well as good rub resistance. As discussed in U.S. Pat. No. 5,242,888, it is known to choose compatible materials for the thermal print head, the thermal transfer ribbon, and ink receptor sheets to optimize performance.

By using a supply roll 16 of tape 14 to create the tags 8, the system can vary the length of the tag for each application using a cutting mechanism triggered by a mark seen by a detector. (The existing systems use a die cut label on a liner which requires the customer to determine what label size is needed and stock this size label for each application.) One aspect of this invention is the ability to apply an infinite number of different tag lengths using one input roll of tape. The length of the tag will depend on where a registration mark is printed. This allows not only printing variable information onto the tape, but also adjusting each tag length to match the requirements of the printed message. The tag width remains constant from the same supply roll source.

Figure 1:
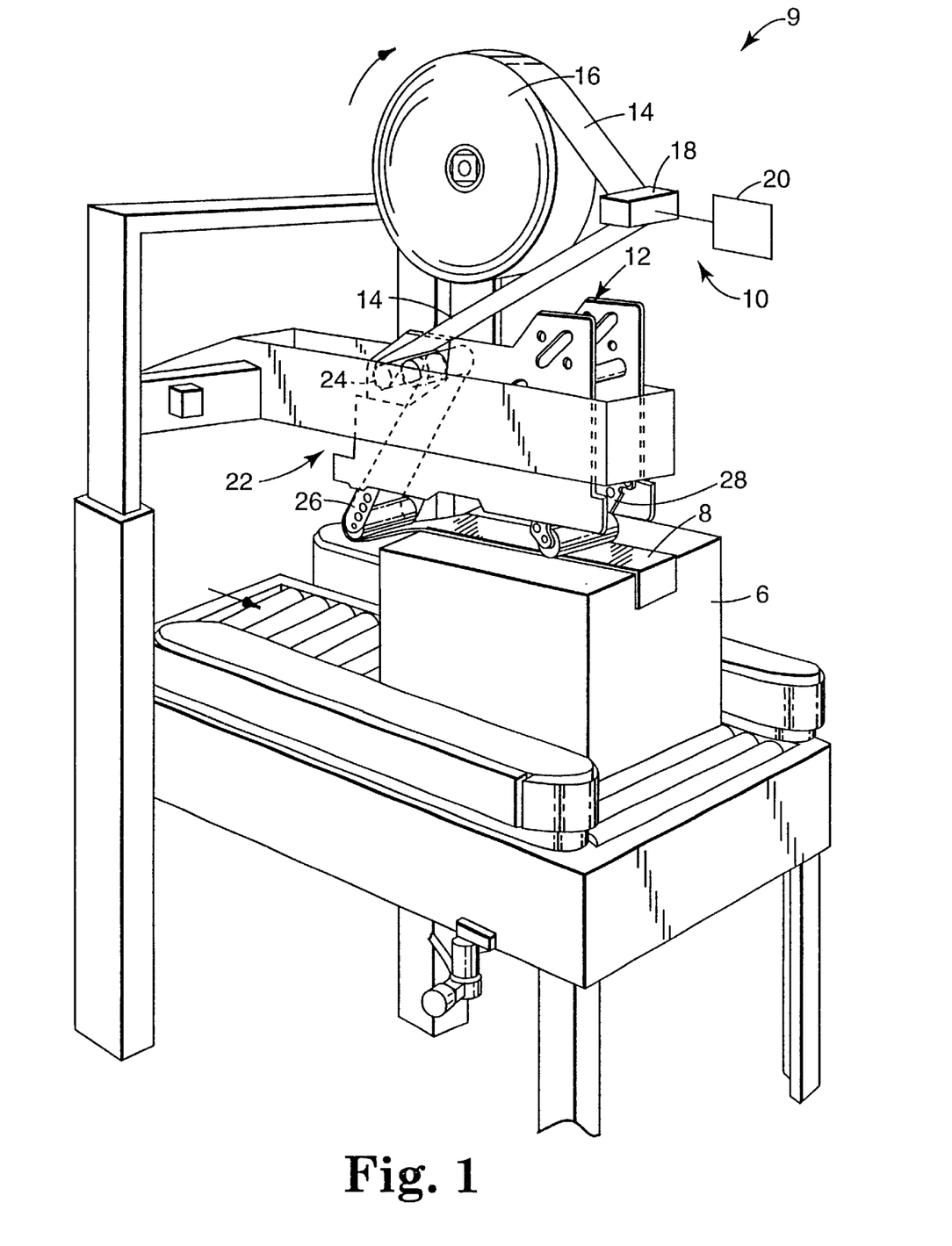
FIG. 1 is a perspective view of the apparatus of the invention.
Figure 2:
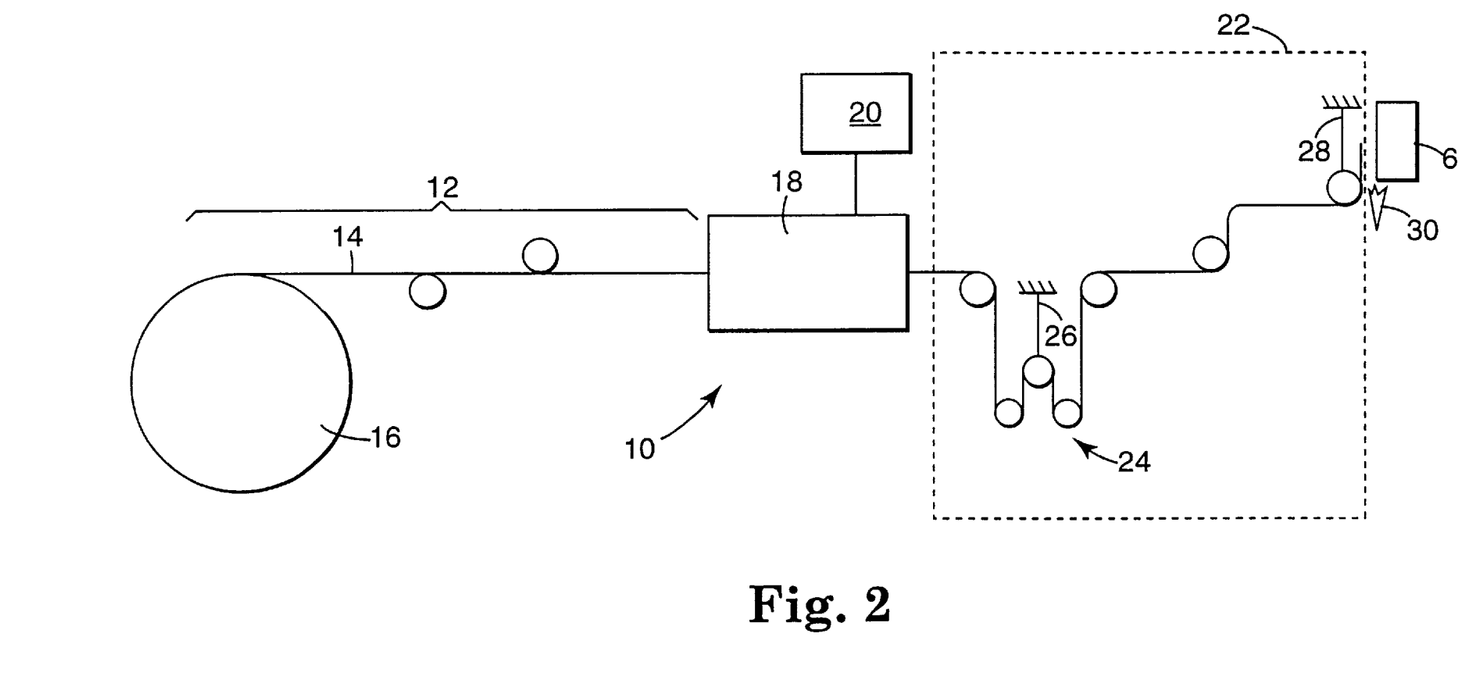
FIG. 2 is a schematic view of the apparatus of FIG. 1.

Tape 14 can be printed and applied to any surface of a box 6 shown in FIGS. 1 and 2. This can be performed several ways. All of these versions of the variable print and apply system 10 include several subcomponents that can be mounted to a case sealer 9. These figures schematically show the system 10 in which several tags 8 are in cue between the printer and the point of application on the box 6. A first tape handling system 12 receives a length of adhesive tape 14, such as from a supply roll 16, unwinds the tape 14 if necessary, and feeds the tape into a printer 18. The printer 18 itself can be the mechanism that pulls the tape 14 from the supply roll 16.

Next, the printer 18 prints the desired information on the tape 14 to form tape segments (not shown independently in the figures). The printer 18 can be an off-the-shelf printer, such as Model DMX PE42 from Datamax Bar Code Products (Eden Prairie, Minn.), or a similar printer or print engine with or without modification, mounted onto the case sealer 9. A controller 20 tells the printer 18 what to print on the tape 14 and how long the tags should be.

An applying mechanism 22 takes the tape segment from the printer 18 and applies it onto a surface of the box 6. This can be performed either before or after cutting the tape segment to form the tag 8. The same or a different controller 20 can control the application of the printed tag 8 onto the box 6. The applying mechanism 22 can include an accumulator 24, which can include a dancer arm 26, and an applicator arm 28. The dancer arm 26 can provide the amount of tape 14 necessary to make up for the difference in speed between the case sealer 9 (38.1 cm/s (15 in/s)) and the printer 18 (20.3–25.4 cm/s (8–10 in/s), depending on the resolution). Also the dancer arm 26 keeps the tension essentially uniform at the output of the printer 18 to eliminate inaccuracies caused by overpulling the tape 14. Alternatively, the case sealer 9 could run slower so that no dancer arm 26 is needed. An alternative to the dancer arm 26 is an open loop system (not shown), where the tape 14 is fed out of the printer 18, winds around a loop, then travels to the taping head. A detector, such as a photosensor determines when the minimum loop is reached and allows the printer 18 to resume printing.

After leaving the dancer arm 26 (or open loop), the printed tape 14 (as tape segments) moves to the applicator arm 28. When a box 6 being conveyed through the case sealer 9 contacts the applicator arm 28 on which the tape segment resides, the printed tape segment adheres to the box 6. The motion of the box 6 causes the applicator arm 28 to pivot to apply the tape segment along one side of the box 6. For an L-clip, when the roller on the applicator arm 28 reaches the corner of the box 6 it rolls around the corner and applies the same piece of tape around the corner and to the adjacent side of the box 6. This method can be used on the upper taping head, the lower taping head, or on side mounted heads.

The tape segment is severed into tags 8 by a cutting mechanism 30. In one embodiment, when a registration mark (printed along with required tag information) passes by a detector, such as a photosensor, an air cylinder is actuated, causing the applicator arm 28 to retract and change the tape path. The new tape path crosses the plane of the cutting mechanism 30. Continued movement of the box 6 causes the tape segment to be cut, and the box continues until it exits the machine. When the photosensor is clear, the air cylinder returns to its home position. The printer 18 prints as required during the application cycle independent of the application process.

In another embodiment, a flat surface applicator (FSA) can be used to apply tape to the sides of boxes. A printer and dancer arm are in the web path before the applicator. With this system, one or more tags of varying length and information can be applied to the same side of a box. A registration mark on the tape determines the length of the tag. A mark on the box or timer initiates the application.

Vacuum belt and vacuum wheel systems also can be used. In a vacuum wheel system, after the tape is printed by the printer 18 to form a tape segment, it is captured by the vacuum wheel and the tape segment is cut to form the tag 8. The vacuum wheel rotates or moves on an arm, as necessary, to position the tag 8. The wheel moves between two positions, a first position in which the wheel receives the tag 8 and a second position in which the tag 8 is applied onto a surface, such as a box. The controller 20 can be used to govern when the vacuum wheel is moved to the second position to apply the tag, for how long the vacuum wheel resides adjacent the surface, and when the vacuum wheel returns to the first position to receive another tag. This system can be adapted to apply both side tags as well as corner tags.

A synergistic feature of the invention is the ability to print variable information onto the pressure sensitive adhesive tape that also seals the box. This combined capability eliminates the need for a secondary information-bearing tag. The tape that seals the box also provides the information. This reduces the amount of tape that is used and eliminates a major sub-component of the case sealer. This tape, therefore, must combine the required sealing properties with the property of being able to receive and hold ink. Also, information can be applied on the portion of the tape which forms the leg of the seal on the side of the box so that it can be read (or scanned) without having to see the top of the box.

The apparatus could operate with a given tape segment that is printed and is not immediately applied onto the next box. The tape segment is wound through a path, such as a festoon, because it will be applied to a box that is several boxes upstream at the time immediately following printing. Several previously-printed tape segments must be applied after the given tape segment is printed and before the given tape segment is applied. Alternatively, the apparatus can operate on a "next tag out" protocol. That is, after the tape segments are printed, they are not placed in a cue to allow one or more previously-printed segments of tape to be applied. In the next tag out system, a tape segment is printed and is either the next or the second segment to be applied. There is no festooning of printed tags.

EXAMPLES

The following examples are provided to aid in understanding the present invention and are not to be construed as limiting the scope. Unless otherwise indicated, "printed information" includes both bar codes, letters, and other information. All example numbers having a "C-" preceding the number are comparative examples; all other example numbers are examples of the invention.

Test Procedures

The following test procedures are used in the examples.

Opacity

Opacity values were obtained with a "LABSCAN 6000" Tester using a HunterLab Master Color Data program (Hunter Associates Laboratory Inc., Reston, Va.). Opacity is measured as an absolute number from 0 to 100. The measurement of opacity is a ratio of the reflectance with 100% reflectance being most opaque, having an opacity of 100.

Scan Rating

Scan rating was determined using a Symbol Laserchek II Bar Code Scanner (Symbol Technologies Inc., Bohemia, N.Y.). Scan rating was determined as described in ANSI X3.182-1990. Scan rating is on a scale of A to F; A is the best rating in terms of edge determination, symbol contrast, edge contrast, decodability, defects, and modulation.

Percent Picking

Ink picking was visually evaluated and rated from 0 to 100% by inspecting the tape sample with the unaided eye. The tape sample was prepared by putting together two portions of tape from the same source. The portions were put together, adhesive to film backing, and rolled down with a small roller using moderate hand pressure. One edge of the upper tape portion was folded under for ease of later separation. The laminated tape sample was placed on a hot plate preheated to 71° C. with the film surface on the hot plate and kept on the hot plate for 10–20 seconds. The sample was removed from the hot plate and allowed to cool to room temperature. The two tape portions of the laminated sample were pulled apart by hand, grasping the folded over portion of the upper tape portion. The separated tape sample was visually inspected to determine how much of the ink from the lower tape portion transferred to the adhesive of the upper tape portion. The sample was held 30–60 cm from the unaided eye for inspection and percent picking rated on a scale of 0 to 100, with 0 being no picking.

Rub Resistance

The printed image on the tape was rubbed with a fingernail using moderate pressure. Rub resistance was rated "Good" (G) when no print was removed, "Medium" (M) when it was difficult to remove print, and "Poor" (P) when it was easy to remove print.

Image Quality

The quality of the printed image on the tape construction was evaluated by viewing the tape construction printed with #8 point size True Type Fonts information. The printed tape was viewed at 30 times magnification using a #FF-393 microscope (from Panasonic, Japan). The tape sample was visually rated as follows:

A=all printed information was sharp and clear (near perfect);

B=all printed information was slightly out of focus;

C=all printed information was out of focus (difficult to read);

D=all printed information was very out of focus with at least a slight amount of ink missing;

F=information did not print or a lot of ink was missing; and

S=the ribbon used in the printer would not follow the tape due to too much slippage of the ribbon against the film surface of the tape.

EXAMPLES 1–64

Tape Constructions A–N in Table 1 were coated with a release coating composition on one side of the film backing and a synthetic rubber resin adhesive on the side of the film opposite the release-coated side. The release coating composition was an organopolysiloxane-polyurea block copolymer as described in U.S. Pat. No. 5,290,615 prepared in solvent from 15 weight percent of a polydimethylsiloxane diamine having a number average molecular weight of about 5000, 60 weight percent of a urea condensate of a polypropylene oxide diamine having a number average molecular weight of about 900, 4.6 weight percent dipiperidyl propane, and 20.4 weight percent of isophorone diisocyanate.

For Tape Constructions A–F, M, and N, either a "Clear" or "White" adhesive (having a coating thickness of about 17 microns) was applied to the film backing opposite the release-coated side. Clear adhesive had an opacity reading of about 0. White adhesive was prepared by adding sufficient $TiO_2$ Stan-Tone HCC-7974 White Pigment Dispersion from Harwick Chemical Corporation (Akron, Ohio) to the clear adhesive to obtain an adhesive with an opacity reading of about 50.

For Tape Constructions G–L, the side of the film backing opposite the release coating was coated with a 3–4 micron thick layer of P-160970 high opacity ink (from Sun Chemicals, Neenah, Wis.). The flood coat of ink was applied with a hand proofer roller. The ink air dried. If more than one coat was applied, subsequent coats were applied within seconds following the previous coat.

For Tape Constructions G–L, Scotch™ 467 MP linered transfer adhesive (3M) was laminated to the flood-coated film on the side of the film backing opposite the release coating. The adhesive was laminated to the film using a small roller with moderate hand pressure.

Tape Constructions O–T were used as obtained from the manufacturer. Tape Constructions O–R had a release coating composition on one side of the film backing. On the side of the film backing opposite the release coating composition, Tape Constructions O and P had an acrylate adhesive and Tape Constructions Q and R had a synthetic rubber resin adhesive.

TABLE 1

| Tape Construction | Film Backing | Adhesive |
|---|---|---|
| A | 30 micron white Polypropylene (PP) | Clear |
| B | 30 micron clear PP | White |
| C | 40 micron white PP | Clear |
| D | 40 micron white PP | White |
| E | 30 micron white Amtopp[1] | Clear |
| F | 30 micron white Amtopp | White |
| G | 30 micron clear PP with one white flood coat | Clear |
| H | 30 micron clear PP with two white flood coats | Clear |
| I | 30 micron clear PP with three white flood coats | Clear |
| J | 40 micron clear PP with one white flood coat | Clear |
| K | 40 micron white PP with two white flood coats | Clear |
| L | 30 micron white Amtopp with 1 white flood coat | Clear |
| M | 50 micron white Nan Ya[2] | Clear |
| N | 35 micron white PP AEP[3] | Clear |
| O - 3M 355[4] | 50 micron clear Polyethylene Terephthalate | Clear |
| P - 3M 375[5] | 50 micron clear PP | Clear |
| Q - 3M 600[6] | 40 micron clear Polyvinyl Chloride | Clear |
| R - 3M 800[7] | 40 micron clear Acetate | Clear |
| S - Vibac[8] | 30 micron clear PP | White |
| T - Davik[9] | 30 micron clear PP | White |

[1]Amtopp = Amtopp WA30T; 3-layer PP film with a total film thickness of 30 microns; (Rocheux International, Carteret, NJ).
[2]Nan Ya = Nan Ya BW9; 3-layer PP film with a total film thickness of 50 microns; (Rocheux International).
[3]AEP = AEP-CS542; 3-layer PP film with a total film thickness of 35 microns; (AEP ™ Industries, South Hackensack, NJ).
[4]3M 355 = Scotch ™ Brand Superior Performance Box Sealing Tape (3M).
[5]M 375 = Scotch ™ Brand Superior Performance Box Sealing Tape (3M).
[6]3M 600 = Scotch ™ Brand Transparent Film Tape (3M).
[7]3M 800 = Scotch ™ Brand Prescription Label Tape (3M).
[8]Vibac = Vibac PP6502 (Vibac Tape Corp., Montreal, Canada).
[9]Davik = Presto Print 840 PP Tape (Davik LTD, Israel).

In Table 1, Tape Constructions C, D, E, F, H, I, J, K, L, M, and N are tape 14 according to the invention. Tape Constructions, A, B, G, O, P, Q, R, S, and T are comparative tape constructions. Various commercially available thermal transfer printer ribbons were used to print on eight of the Tape Constructions identified in Table 1. Each ribbon is identified by the Identification Number as supplied by the manufacturer (ID#). The general ribbon type as to Resin (Re), Wax (W), or Wax/Resin (W/Re) is set forth in column 1 of Table 2. The printer was a Zebra 170si Thermal Transfer Printer (Zebra Corporation, Vernon Hills, Ill.). After being printed with information, each comparative Tape Construction in Table 2 was evaluated in terms of Image Quality, Percent Picking, and Rub Resistance using the Test Procedures detailed above.

TABLE 2

| Ribbon (ID #, Type) | Tape Construction (Image Quality, Percent Picking, Rub Resistance) | | | | | | | |
|---|---|---|---|---|---|---|---|---|
| | A | B | O | P | Q | R | S | T |
| ICS4099-1[1], Re | A,60,G | A,5,G | C,10,P | D,80,P | A,5,M | C,5,M | C,5,G | B,40,G |
| ICS4099-2[1], W/Re | B,80,G | B,50,G | C,5,P | F,80,P | D,5,M | D,80,M | C,10,M | C,5,M |
| Sony4085[2], W | A,80,P | A,50,P | C,10,M | C,50,M | C,20,M | C,80,M | C,15,P | C,15,P |
| Sony4050[2], W | F,80,P | F,80,P | D,10,P | D,70,P | D,20,P | C,50,P | C,20,P | C,20,P |
| Sony4041[2], R | F,90,M | F,90,M | C,80,P | C,90,P | D,90,P | C,90,P | B,50,M | B,50,M |
| Sony5050[2], W/R | F,60,M | F,50,M | C,60,P | C,30,P | D,60,M | B,70,P | C,20,M | C,10,M |
| Sony4088[2], W/R | F,50,M | F,50,M | D,50,P | D,30,P | D,50,M | B,50,P | D,10,M | D,20,M |
| Sony4070[2], Re | B,80,G | B,50,G | D,50,G | C,90,G | B,20,G | A,50,G | C,50,G | B,90,G |
| Sony4075[2], Re | A,90,G | A,50,G | A,10,G | B,90,G | A,10,G | A,10,G | B,2,G | A,1,G |
| Advent501[3], Re | B,90,G | B,10,G | C,50,G | F,90,G | B,10,G | A,20,P | B,2,G | A,10,G |
| Advent301[3], Re | C,90,M | C,50,M | D,40,M | D,70,M | D,30,M | C,30,M | D,2,G | D,30,G |
| RicolR110c[4], Re | A,80,G | A,10,G | A,5,G | A,90,G | A,5,G | A,30,G | B,5,G | A,90,G |
| ArmorAxr7[5], Re | B,90,M | B,50,M | D,70,M | D,90,M | C,90,M | D,70,M | C,20,G | C,90,G |
| ArmorAxr7+[5], Re | S,30,G | S,50,G | C,50,G | D,90,G | A,10,G | B,10,G | C,20,G | B,90,G |
| Ubi501[6], Re | A,90,G | A,50,G | C,20,G | D,90,G | A,5,G | A,5,G | C,10,G | B,10,G |
| Zebra5175[7], Re | D,90,G | F,50,G | B,50,G | F,90,G | A,60,G | D,70,G | B,10,G | A,90,G |
| Zebra5099[7], Re | A,70,G | A,5,G | B,60,G | D,90,G | A,70,G | D,70,G | C,10,G | A,90,G |
| Markem717[8], Re | A,80,M | A,10,M | B,90,P | B,90,P | A,60,P | B,70,M | B,5,G | B,60,G |
| Cg180[9], Re | B,90,G | B,10,G | B,1,G | B,90,G | B,0,G | A,0,G | C,1,G | B,1,G |
| Cg180he[9], Re | D,90,G | F,50,G | A,5,G | F,90,G | A,10,G | A,10,G | A,1,G | A,1,G |
| Ncr Matrix[10], Re | D,30,G | D,20,G | D,50,G | D,50,G | D,30,M | D,20,M | D,20,G | D,30,G |
| Ncr Pro2[10], Re | D,60,M | D,20,M | D,95,P | D,90,P | D,90,P | D,90,P | C,10,G | A,5,G |
| Iimak sh36[11], Re | A,90,G | A,50,G | A,30,G | A,90,G | A,60,G | A,90,M | B,20,G | A,95,G |
| Iimak hd68[11], Re | A,50,G | S,20,G | C,5,G | C,90,G | B,5,G | S,20,G | C,20,G | B,20,G |
| Iimak sp330[11], Re | D,90,G | A,50,G | C,40,G | D,90,G | A,10,G | A,5,G | C,50,G | B,90,G |
| Sato prem1[12], Re | S,90,G | S,50,G | B,50,G | C,90,G | B,90,G | A,5,G | C,5,G | B,90,G |
| Int053858[13], Re | S,50,G | S,10,G | B,40,G | B,90,G | A,40,G | A,90,G | B,10,G | A,90,G |
| Int053258[13] Re | A,60,G | A,5,G | B,30,G | C,90,G | A,80,G | A,90,G | B,5,G | A,90,G |
| Japan r1[14], Re | S,50,G | S,10,G | C,40,G | D,90,G | C,40,G | D,90,G | C,5,G | C,90,G |
| Japan Heavy[14], Re | A,50,G | A,5,G | A,40,G | B,90,G | A,90,G | A,90,G | A,5,G | A,90,G |
| Japan ri130[14], Re | S,50,G | S,10,G | C,40,G | D,90,G | C,50,G | D,90,G | C,10,G | C,90,G |

[1] Obtained from ICS Corporation (Neu-Anspach, Germany).
[2] Obtained from Sony Chemicals Corporation of America (Wooddale, IL).
[3] Obtained from Advent Corporation (Concord, SC).
[4] Obtained from Ricol (Santa Ana, CA).
[5] Obtained from Armor (Cedex, France).
[6] Obtained from UBI Printer AB (Molndal, Sweden).
[7] Obtained from Zebra Technologies Corporation.
[8] Obtained from Markem (Keene, NH).
[9] Obtained from Mid-City Columbia Inc. (Dayton, OH).
[10] Obtained from NCR Corporation (Dayton, OH).
[11] Obtained from Paxar Corporation (Amherst, NY).
[12] Obtained from Sato Corporation (Sunnyvale, CA).
[13] Obtained from Intermac (Fairfield, OH).
[14] Obtained from Japan Pulp & Paper Corporation (Tucker, GA).

Sixteen of the Tape Constructions identified in Table 1 were printed with information using a Zebra 5099 resin ribbon in a Zebra 170xi Thermal Transfer Printer (Zebra Technologies Corporation).

Each of the Tape Constructions described in Table 3 was evaluated in terms of opacity, scan rating on a black background, scan rating on a white background, scan rating on a corrugated background, scan rating on a printed corrugated background, and rub resistance.

Each example was scanned according to the Scan Rating Test Procedure detailed above. The adhesion of the print to the tape construction was evaluated using the Rub Resistance Test Procedure detailed above. For each example, the Rub Resistance Test rating was Good.

In Table 3, Example Numbers 3–6, and 8–14 are tape 14 of the invention.

TABLE 3

| Example No. | Tape Construction From Table 1 | Opacity | Scan Rating on Background | | | |
|---|---|---|---|---|---|---|
| | | | Black[1] | White[2] | Corrugated[3] | Printed Corrugated[4] |
| C-1 | A | 54 | F | A | D | F |
| C-2 | B | 60 | F | A | D | F |
| 3 | C | 65 | D | A | C | D |
| 4 | D | 81 | B | A | B | C |
| 5 | E | 80 | B | A | B | B |
| 6 | F | 87 | A | A | A | A |
| C-7 | G | 57 | F | A | D | F |
| 8 | H | 77 | C | A | B | D |
| 9 | I | 83 | B | A | B | B |
| 10 | J | 83 | B | A | B | B |
| 11 | K | 87 | A | A | A | A |

TABLE 3-continued

| Example No. | Tape Construction From Table 1 | Opacity | Scan Rating on Background | | | |
|---|---|---|---|---|---|---|
| | | | Black[1] | White[2] | Corrugated[3] | Printed Corrugated[4] |
| 12 | L | 93 | A | A | A | A |
| 13 | M | 94 | A | A | A | A |
| 14 | N | 89 | A | A | A | A |
| C-15 | S | 32 | F-ND[5] | A | F | F-ND |
| C-16 | T | 46 | F-ND | A | D | F |

[1]Black = black square on standard opacity chart Form 2A from The Lenata Company (HoHoKus, NJ). The L* color coordinate of the black was 0.
[2]White = white square on standard opacity chart Form 2A from The Lenata Company. The L* color coordinate of the white was 93.
[3]Corrugated = square of standard shipping box from Packaging Corporation of America (Trexlertown, PA).
[4]Printed Corrugated = square of standard corrugated shipping box with an area of about 6 cm × 25 cm containing 12 point black printing covering at least about 80% of the scanned area.
[5]F-ND = no decode; no scan rating was obtained.

The examples of tape 14 of the invention have a scan rating of D or better on a black background. As explained above and as evident from Table 3, testing on a black background is more rigorous than testing on a white background.

Comparative Examples 17–64 in Table 4 detail the superiority of the tape of the invention in a different way. These examples show the backgrounds on which the tape 14 will work and on which the comparative tapes will not work. Forty-eight color chip cards identified in Table 4 were obtained from Valspar Corporation, Wheeling, Ill. The color chip cards ranged from light to dark for each color.

The L*, a*, and b* color coordinate values for each color chip card were determined according to the CIE 1976 L*a*b* (CIELAB) color determination methods described in Billmeyer & Saltzman, *Principles of Color Technology*, 2$^{nd}$ Ed., pp. 62–65 (1981). The color coordinates for standard daylight conditions (Illumination Standard D65, described below) were measured for each color chip card using the "LABSCAN 60000" Tester and using a HunterLab Master Color Data program. The sample port was 12.7 mm in diameter, the observer was set at D65, and the observer angle was set at 10 degrees. The L*, a*, and b* reflection color coordinates were obtained by placing each color chip card in the sample port. The L*, a*, and b* values for each color chip card are reported in Table 4

The measurements of L*, a*, and b* were made using the Illumination Standard D65. This standard includes a continuous spectrum of light having wavelengths of 300 nm to 830 nm. This includes human visible light, near ultraviolet light, and near infrared light. The laser scanner uses a single component of light having a wavelength of 680 nm. The wavelength intensity of the red and infrared regions is relatively constant. This means that the results in the infrared regions would be functionally the same as in the visible light regions. In the studied areas, the L*, a*, and b* readings show that the laser scanner can properly read contrast in materials which have negative a* values. The areas which have positive a* values are where the scan ratings were low.

Using a Datamax PE43 Thermal Transfer Printer (Data Max Corp., Orlando, Fla.), a single bar code was printed on the side of the tape opposite the adhesive-coated side. The tape was Tape Construction T from Table 1. A laminate of each color chip card and bar code-printed tape segment was formed by placing the printed tape segment on the color surface of each color chip card and rolling the tape down with a roller using moderate hand pressure.

Each laminate was scanned using the Scan Rating Test Procedure above. The scan rating is listed in the last column of Table 4. The data in Table 4 were analyzed using a regression analysis of the scan rating as a function of the L*, a*, and b* color coordinates. The scan rating was converted to a numerical value, and a model linear in L*, a*, and b* was used. The method of regression analysis of data is described in N. 35 Draper and H. Smith, *Applied Regression Analysis*, 2$^{nd}$ Ed., Chapters 2 and 6 (1966). The analysis of the regression results showed that the coefficient for b* was not statistically significant; the scan rating could be predicted on a model based on L* and a* independent of b*. b* is insignificant because the ability to scan is independent of the blue and yellow components of the background color. The amount of red, however, is important.

Figure 3:
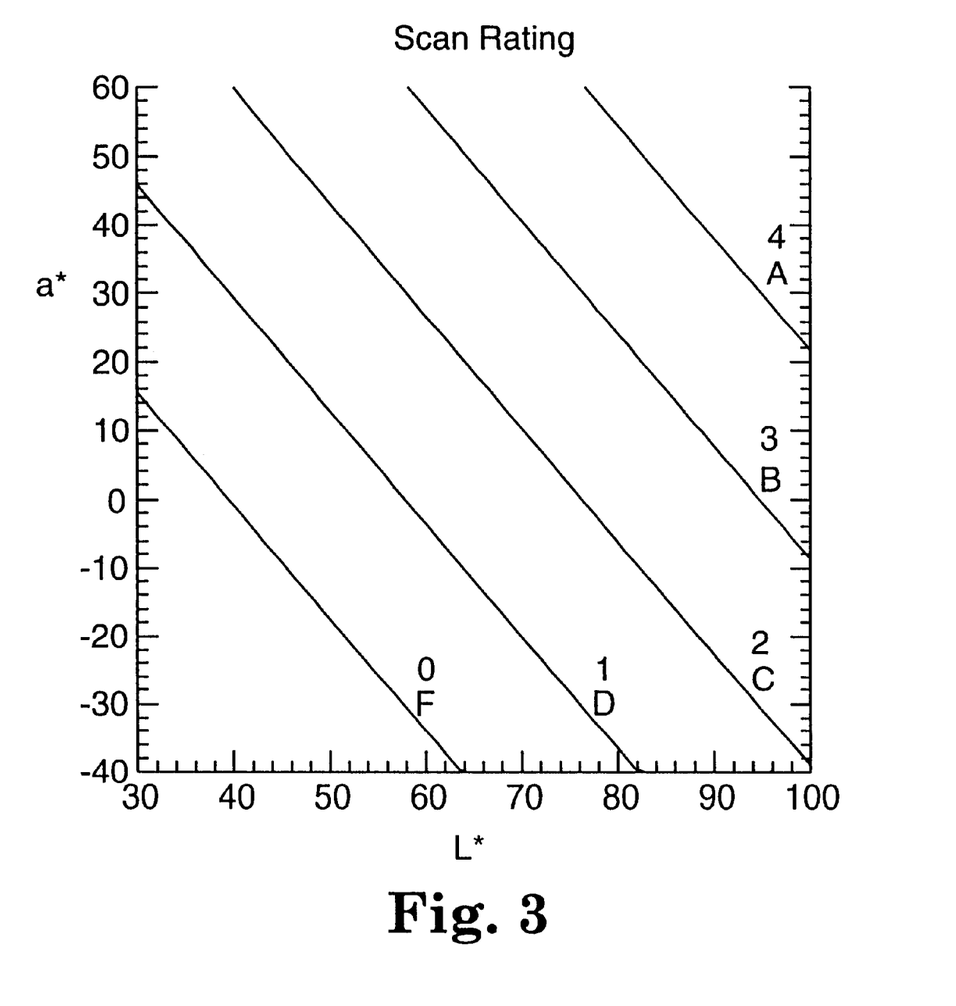
FIG. 3 is a contour plot of the scan rating of a bar code-printed tag on color chip cards as a function of the $L^*$ and $a^*$ color coordinates of the cards.

The regression model is: scan rating=−2.1+0.054(L*)+0.033(a*) when the scan rating is defined as A=4, B=3, C=2, D=1, and F=0. The regression model has a correlation coefficient of 0.87. From the regression model, to obtain an A scan rating, for example, using Tape Construction T, the background must satisfy the equation: 4=−2.1+0.054(L*)+0.033(a*). A contour plot of the scan rating as a function of L* and a* is shown in FIG. 3. (The axes of the graph were chosen based on the location of the measured data points.) This shows the regions of L* and a* combinations which are predicted to provide the various scan ratings. Thus, for an A scan rating the background would need to be in the upper right portion of the graph. B or better scan ratings are found against backgrounds which are to the right of the "B" line in FIG. 3, and so on.

Although FIG. 3 graphs Tape Construction T, a graph of Tape Construction C would have a similar plot, due to their similar characteristics. Similarly, a regression model for Tape Construction C would be similar to that for Tape Construction T. Tape Construction T was chosen because it is the best performing comparative tape.

TABLE 4

| Example No. | Color | Color Chip Identification | L* | a* | b* | Scan Rating |
|---|---|---|---|---|---|---|
| C-17 | Yellow | 203-1 | 96.41 | −0.36 | 20.37 | A |
| C-18 | Yellow | 203-2 | 96.01 | 0.51 | 33.28 | A |
| C-19 | Yellow | 203-3 | 92.59 | 2.23 | 47.17 | B |
| C-20 | Yellow | 203-4 | 90.03 | 6.96 | 63.13 | B |
| C-21 | Yellow | 203-5 | 84.99 | 13.51 | 79.75 | B |
| C-22 | Yellow | 203-6 | 81.12 | 17.25 | 86.01 | C |
| C-23 | Orange | 205-1 | 93.86 | 3.37 | 20.19 | A |
| C-24 | Orange | 205-2 | 89.62 | 8.73 | 33.03 | A |
| C-25 | Orange | 205-3 | 84.92 | 14.64 | 43.36 | B |
| C-26 | Orange | 205-4 | 78.98 | 21.91 | 53.02 | B |
| C-27 | Orange | 205-5 | 74.69 | 27.34 | 58.88 | B |
| C-28 | Orange | 205-6 | 69.73 | 31.11 | 67.28 | C |
| C-29 | Red | 209-1 | 93.51 | 7.76 | 2.02 | B |
| C-30 | Red | 209-2 | 89.15 | 13.32 | 2.29 | B |
| C-31 | Red | 209-3 | 83.96 | 19.71 | 3.55 | B |
| C-32 | Red | 209-4 | 76.41 | 28.55 | 5.76 | B |
| C-33 | Red | 209-5 | 66.46 | 37.62 | 10.72 | B |
| C-34 | Red | 209-6 | 53.57 | 44.93 | 28.01 | C |
| C-35 | Purple | 213-1 | 90.53 | 5.13 | −4.86 | B |
| C-36 | Purple | 213-2 | 87.02 | 7.32 | −8.14 | B |
| C-37 | Purple | 213-3 | 82.73 | 9.69 | −12.62 | B |
| C-38 | Purple | 213-4 | 70.18 | 14.78 | −20.75 | C |
| C-39 | Purple | 213-5 | 55.16 | 18.98 | −28.74 | D |
| C-40 | Purple | 213-6 | 39.79 | 21.33 | −29.96 | D |
| C-41 | Brown | 228-1 | 86.92 | 3.61 | 8.54 | C |
| C-42 | Brown | 228-2 | 82.41 | 4.46 | 9.69 | C |
| C-43 | Brown | 228-3 | 69.88 | 6.58 | 12.97 | C |
| C-44 | Brown | 228-4 | 58.62 | 7.61 | 14.21 | D |
| C-45 | Brown | 228-5 | 47.96 | 8.01 | 14.61 | F |
| C-46 | Brown | 228-6 | 37.86 | 8.25 | 16.54 | F |
| C-47 | Black | 338-1 | 85.38 | −0.58 | −0.37 | C |

TABLE 4-continued

| Example No. | Color | Color Chip Identification | L* | a* | b* | Scan Rating |
|---|---|---|---|---|---|---|
| C-48 | Black | 338-2 | 76.74 | −0.69 | −1.85 | D |
| C-49 | Black | 338-3 | 66.36 | −0.79 | −3.01 | D |
| C-50 | Black | 338-4 | 50.44 | −0.91 | −4.47 | F |
| C-51 | Black | 338-5 | 42.96 | −0.91 | −4.48 | F |
| C-52 | Black | 339-6 | 32.22 | −0.51 | −2.12 | F |
| C-53 | Blue | 248-1 | 88.58 | −2.89 | −10.58 | B |
| C-54 | Blue | 248-2 | 81.03 | −4.04 | −19.85 | C |
| C-55 | Blue | 248-3 | 69.41 | −4.35 | −32.46 | D |
| C-56 | Blue | 248-4 | 58.65 | −3.63 | −41.21 | F |
| C-57 | Blue | 248-5 | 51.19 | −2.45 | −44.21 | F |
| C-58 | Blue | 248-6 | 34.01 | 2.71 | −43.64 | F |
| C-59 | Green | 225-1 | 92.44 | −8.43 | 3.49 | C |
| C-60 | Green | 225-2 | 86.77 | −15.64 | 5.24 | C |
| C-61 | Green | 225-3 | 78.05 | −23.68 | 9.01 | F |
| C-62 | Green | 225-4 | 68.82 | −29.63 | 10.89 | F |
| C-63 | Green | 225-5 | 62.04 | −31.97 | 11.68 | F |
| C-64 | Green | 225-6 | 55.46 | −33.91 | 13.11 | F |

In contrast to the examples of comparative tapes which have distinct, relatively narrow ranges of satisfactory scannability, the adhesive tape of the invention can attain good scan ratings in a range of color coordinates where comparative tapes could not attain such scan ratings.

Tests of several tapes according to the invention show that, even against backgrounds in which the comparative tapes (Example Numbers C-1, C-2, C-7, C-15, and C-16) had F scan ratings (refer to Table 3 in which the black background for the test had an L* of 0), the tape 14 attained at least D scan ratings and examples 6, 11, 12, 13, and 14 had A scan ratings. (As shown in Table 4, Tape Construction T had F scan ratings on much lighter backgrounds.) This means that, unlike the comparative tapes, the tape of the invention can attain A scan ratings regardless of the background to which it is adhered. The tape can actually attain A ratings when adhered to surfaces that have color coordinates including any a*, any b*, and any L*.

To quantify this another way, the tape of the invention, therefore, is capable of achieving a readable scan rating when adhered to every surface regardless of the color coordinates of a particular surface. The tape can achieve a scan rating of at least D when adhered to surfaces that have color coordinates that satisfy the equation: 1>[−2.1+0.054(L*)+0.033(a*))]; a scan rating of at least C when adhered to surfaces that have color coordinates that satisfy the equation: 2>[−2.1+0.054(L*)+0.033(a*)]; a scan rating of at least B when adhered to surfaces that have color coordinates that satisfy the equation: 3>[−2.1+0.054(L*)+0.033(a*)]; and a scan rating of A when adhered to surfaces that have color coordinates that satisfy the equation: 4>[−2.1 +0.054(L*)+0.033(a*)].

Various changes and modifications can be made in the invention without departing from the scope or spirit of the invention. For example, although the illustrated embodiments use thermal ribbon printing, inkjet coding systems and other printing systems also can be used. Also, printing could occur on the adhesive portion of the tape. The disclosures of all patents mentioned in this application are incorporated by reference.

What is claimed is:

1. An adhesive tape having variable information printed thereon to form a tag in combination with a box comprising:
   a) a box including sides, corners and seams;
   b) an adhesive tape having variable information printed thereon to form a tag, wherein the tag is applied to at least one of the sides, corners, or seams of the box, wherein the adhesive tape comprises:
      i) a non-paper backing layer having a first side and a second side;
      ii) an adhesive layer located on the first side of the backing layer; wherein at least one of the backing layer and the adhesive layer is colored to yield a tape opacity of greater than 65, and wherein the adhesive tape has a scan rating of at least C when applied on a black background; and
      iii) ink printed on the side of the tape opposite the adhesive layer.

2. The adhesive tape of claim 1 wherein the adhesive tape further comprises a flood coat of ink located at least one of: between the backing layer and the adhesive layer, and on the second side of the backing layer.

3. The adhesive tape of claim 1 wherein the tag has a scan rating of A when applied on a black background and an opacity of at least 80.

4. The adhesive of claim 3 wherein the tag has a rub resistance of at least food.

5. The adhesive tape of claim 1 wherein the color of at least one of the backing layer and the adhesive layer is white.

6. The adhesive tape of claim 1 wherein the tag can serve as a box sealing tape.

7. The adhesive tape of claim 1 further comprising a low adhesion backsize layer located on the second side of the backing layer.

8. The adhesive tape of claim 7 wherein the low adhesion backsize layer is selected from the group consisting of a silicone, an alkyl, fluorochernical constituents, or comnbinations thereof.

9. The adhesive tape of claim 1 wherein the backing layer is treated by a process selected from the group consisting of utilization of a primer, flame, or corona techniques.

* * * * *

UNITED STATES PATENT AND TRADEMARK OFFICE
CERTIFICATE OF CORRECTION

PATENT NO. : 6,432,528 B1
DATED : August 13, 2002
INVENTOR(S) : Faust, Michael C. et al.

It is certified that error appears in the above-identified patent and that said Letters Patent is hereby corrected as shown below:

Column 15,
Line 40, "using the "LABSCAN 60000" Tester and using a HunterLab" should read -- using the "LABSCAN 6000" Tester and using a HunterLab" --

Column 16,
Line 8, "described in N. 35 Draper and H. Smith" should be -- described in N. Draper and H. Smith --

Column 18,
Line 36, "resistance of at least food." should be -- resistance. --

Signed and Sealed this

Ninth Day of September, 2003

JAMES E. ROGAN
*Director of the United States Patent and Trademark Office*